United States Patent [19]

Miller et al.

[11] Patent Number: 5,133,881
[45] Date of Patent: Jul. 28, 1992

[54] ASSEMBLY FOR OIL AND GREASE REMOVAL FROM DRAINWATER MOUNTED TO FACILITATE PARTS REPLACEMENT

[75] Inventors: B. Glenn Miller; William C. Batten, both of Asheboro, N.C.

[73] Assignee: Thermaco, Inc., Asheboro, N.C.

[21] Appl. No.: 558,071

[22] Filed: Jul. 25, 1990

[51] Int. Cl.$^5$ .............................. C02F 1/40; E03F 5/16
[52] U.S. Cl. ................................... 210/776; 210/237; 210/242.4; 210/523; 210/924
[58] Field of Search ................. 74/413, 415, DIG. 10; 210/187, 232, 237, 238, 249, 258, 259, 261, 241, 242.4, 513, 523, 538, 540, 776, 800, 806, 923, 924, 154

[56] References Cited

U.S. PATENT DOCUMENTS

| | | | |
|---|---|---|---|
| 530,684 | 12/1894 | Gibbons | 210/232 |
| 773,362 | 10/1904 | Anderson | 74/415 |
| 1,860,819 | 5/1932 | Schamberger | 210/523 |
| 3,365,060 | 1/1968 | Hsu | 210/790 |
| 3,539,508 | 11/1970 | Bulkley et al. | 210/671 |
| 3,612,277 | 10/1971 | Van Stavern | 210/776 |
| 3,693,805 | 9/1972 | Tillett et al. | 210/519 |
| 3,905,902 | 9/1975 | Hoegberg | 210/671 |
| 3,916,674 | 11/1975 | Miller et al. | 73/61.1 R |
| 4,021,344 | 5/1977 | Webb | 210/776 |
| 4,051,024 | 9/1977 | Lowe et al. | 210/671 |
| 4,235,727 | 11/1980 | Shimko | 252/8.51 |
| 4,264,450 | 4/1981 | Ayers et al. | 210/671 |
| 4,268,396 | 5/1981 | Lowe | 210/670 |
| 4,651,762 | 3/1987 | Bowden | 210/523 |
| 4,869,236 | 9/1989 | Blough | 210/540 |
| 4,983,284 | 1/1991 | Batten | 210/523 |

FOREIGN PATENT DOCUMENTS

| | | | |
|---|---|---|---|
| 3215896 | 11/1983 | Fed. Rep. of Germany | 210/187 |
| 4830826 | 9/1973 | Japan | 210/242.4 |
| 60-120022 | 6/1985 | Japan | 74/DIG. 10 |
| 8502049 | 2/1987 | Netherlands | 210/513 |
| 1269809 | 11/1986 | U.S.S.R. | 210/523 |
| 10958 | of 1915 | United Kingdom | 210/538 |

OTHER PUBLICATIONS

Models 1×8, 1×4, and Tote-It portable oil skimmer of Abanaki Corporation, Chagrin Falls, Oh., brochure (Pub. date unknown).
Skim-Kleen belt skimmers of Tenco-Hydro, Inc. Brookfield, Illinois, brochure (Pub. date unknown).
EPIC Auto-Skim grease & Oil Interceptors from Engineered & Programmed Interception & Collection, Buffalo, N.Y. brochure (Pub. date unknown).
Model 2383 5000 and 2384 5002 skimmers from Rutland Tool & Supply Co., Inc., catalog 0689 (expires 9/89) Houston, Tex. (published prior to Sep. 1989.
Westmont Products skimmer described in Machine Design Oct. 11, 1984, p. 14.

Primary Examiner—Robert A. Dawson
Assistant Examiner—Joseph Drodge
Attorney, Agent, or Firm—Rhodes, Coats & Bennett

[57] ABSTRACT

An oil or grease removal assembly of the type used to remove such contaminants from the surface of a body of water includes a rotatable disk made of plastic or other material to which such oil contaminants have an affinity, disposed in cooperative relation to an elongated trough having scraper blades for engaging the opposite sides of the disk for the removal of the oil contaminants therefrom with the trough disposed and structured to direct such oil contaminants away from the disk and the body of water such as to an outlet chute during the continuous rotation of peripheral driving of the disk. The trough has a hook-like element to permit it to be removably mounted straddling the disk.

28 Claims, 3 Drawing Sheets

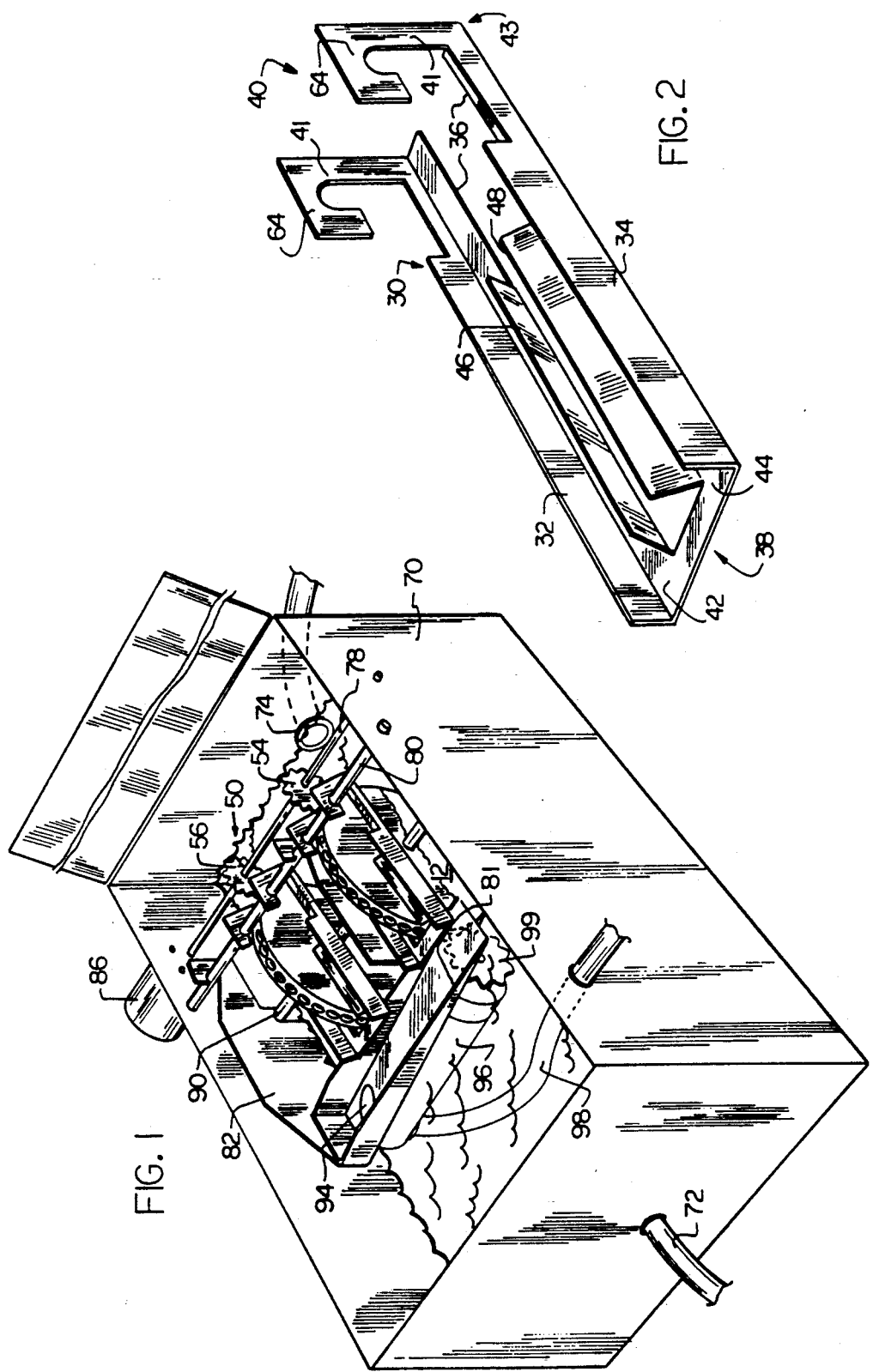

ASSEMBLY FOR OIL AND GREASE REMOVAL FROM DRAINWATER MOUNTED TO FACILITATE PARTS REPLACEMENT

BACKGROUND OF THE INVENTION

1. Field of the Invention

This invention relates to an assembly for the removal or recovery of petroleum oils, fats, greases, lipids or like liquid of the type found in the drains or effluent discharge of restaurants, food processing or like facilities, industrial plants, maintenance facilities or other circumstance involving mixtures of aqueous liquid and the material to be removed or recovered.

2. Description of the Prior Art

Oil and grease contaminant removal or recovery systems are well known in the prior art. It is desirable in modern day plumbing facilities to remove as much of the collected oil and grease from drain water as possible in order to alleviate any clogging difficulties with conventional plumbing or sewage systems to which the drain water is ultimately directed and to reduce the load to be processed by sewage treatment facilities.

One method recognized in the prior art of accomplishing such removal is the use of one or more rotating disks formed of a plastic or like applicable material to which oil and grease contaminants are attracted. Typically, the rotation of the disk in an at least partially immersed condition allows the oil to cling to one or both sides of the disk so the contaminants are removed from the body of water upon rotation of the disk. A scraper is typically used to force the oil contaminants from the opposite sides of the disk and channel such contaminants, once removed, to a collection or disposal facility.

The following U.S. Patents are representative of such oil, grease and like contaminant removal structures.

U.S. Pat. No. 1,860,819 to Schamberger discloses an apparatus for removal of oil from water by the use of rotating cylinders such that the oil is picked up by the circumferential sides of the cylinders and scraped therefrom.

U.S. Pat. No. 3,905,902 to Hoegberg et al. discloses a recovery system for oil and oil soluble contaminants using a negatively electrostatically charged hydrophobic rotating disk immersed in the water to be cleaned. Wiper blades bear against opposite sides of the disk in order to remove oil contaminants. Such contaminants are conveyed away to a storage facility. The wiper of this invention is pressed physically against the rim of the disk with considerable force so as to frictionally bear against the disk and produce a static charge by triboelectric effect. To do this and produce a negative electrostatic charge is important to the stated invention. Contact with the disk for the removal of the oil is accomplished by a bifurcated wiper member arranged at an angular orientation for the channeling of the collected oil therefrom and further wherein the disk or the disks utilized are electrostatically isolated from grounded conductors in contact with the water.

U.S. Pat. No. 4,051,024 to Lowe et al. discloses an oil recovery apparatus and method including a plurality of disks carried on a rotatable shaft partially immersed in the fluid to be cleaned. Opposite sides of the disks are scraped by scraping blades arranged at a particular orientation by means of a channeled holder of such blades which is angularly oriented to facilitate removal of the collected contaminants by gravity.

U.S. Pat. No. 4,268,369 to Lowe discloses an oil recovery apparatus and method particularly for removing oil and grease from the discharge of dishwashing machines and the like and employs a single rotating disk of plastic or like material engaging a pair of spaced apart scraper blades arranged to scrape opposite side of the rotating blade. The blades are mounted on a removable bridge member extending above a high point of the disk and depend downwardly therefrom in substantially transverse relation to the surface of the body of water being cleaned. A discharge conduit is disposed in direct fluid communication with one of the blades for the removal of the collected contaminants to a collection or disposal facility.

Similarly, U.S. Pat. No. 4,651,762 to Bowden discloses an agitation parts degreaser also incorporating as a part thereof a rotating disk made of appropriate material to which oil contaminants are collected and further incorporating a pair of spaced apart scraper blades engaging opposite sides of the disk for removal and disposal of the contaminants collected from such opposite sides during continuous rotation of the disk.

U.S. Pat. No. 4,235,726 to Shimko, assigned to the assignee of the present application, discloses an automatic grease separating apparatus in which a curved plate reciprocates into and out of the contaminated water, with scrapers aligned to scrape grease and oil from the plate on its trip out of the water.

The above-mentioned devices are assembled with rigid mounting means to position the scraper drive mechanism and oil/grease discharge chute. This makes servicing of the apparatus exceedingly difficult, particularly since the parts to be serviced have been covered in grease or oil. The likelihood that bolts or other parts will be dropped by servicemen is very high in these circumstances, and the location to which the dropped part falls—submerged in waste water—is a very unpleasant location from which to retrieve the lost part. In addition, since the units are usually permanently installed in a plumbing system, field service is required and the prior designs have not accommodated themselves to such service.

Accordingly, there is a need in the art for a new apparatus for separation of oil/grease from wastewater which is simple in design so that service is not often needed, yet capable of being done in the field by simple replacement of easily replaceable parts.

SUMMARY OF THE INVENTION

The present invention fulfills the need by providing an oil, grease or like contaminant removal assembly. It includes a support means such as a container of the type typically used to receive discharge or drain water from various washing and/or like kitchen facilities. Alternatively, the support means may be a floating device or a housing adapted to be located in another container holding the contaminated water. The removal assembly of the present invention incorporates a plastic or other material disk to which such oil or grease contaminants are typically attracted rotatably mounted on a support shaft. A preferred material is polypropylene, which is oleophilic and hydrophobic. An external drive means is disposed to engage the disk so as to cause its continuous rotation about the support shaft in one direction. The drive means preferably includes a drive shaft having drive gear mounted thereon which meshes with a plurality of openings spaced apart around the peripheral edge of the disk.

The contaminants are removed by an elongated trough having an open delivery end. The trough further includes an elongated slot of sufficient transverse dimension to allow the disk to be positioned therein while it is being rotated, with opposed slot edges. Angularly oriented scraper blades extend along opposite slot edges generally at one end and of the trough adjacent to the open or delivery end. At the other end, the trough is provided with suspension means in the form of hooks to permit the trough to be hung in place on a lug portion of the assembly so the trough straddles the disk. The angularly oriented scraper blades are disposed such that their free edges scrapingly engage opposite axial sides of the disk during its rotation. Such scraping contact will of course cause removal and dislodgement of the oil as well as any other contaminants from the opposite sides of the disk during its continuous rotation. The trough further includes elongated trough segments disposed outward of each of the blades and is further defined by upwardly directed side walls of the trough. Such trough segments are configured and disposed to effectively direct the collected oil or like contaminants longitudinally along their respective lengths to the open end of the trough.

The assembly further includes a discharge chute which receives oil/grease from the trough and directs it to a storage container Preferably the chute extends transversely of the trough and provides a support for the open end of the trough. More preferably, the chute includes a drainage pump to drain oil/grease collected in the chute, with the pump being driven by a gear enmeshed with the disk Still more preferably, the pump is submerged below the static water line of the assembly and the assembly is provided with a heater to heat liquid in the assembly, so the pump is thereby heated by contact with the liquid and serves to convey heat to the chute to maintain oil/grease in flowable form.

In addition, the chute is provided with support brackets which have suspension portions to permit the chute to be supported in the assembly by suspension on lug portions of the assembly.

When used with a housing to contain the contaminated water, the assembly desirably includes inlet and outlet ports and baffles as described in the abovementioned U.S. Pat. No. 4,235,726 to Shimko, the entire disclosure of which is hereby incorporated by reference. Preferably the lug portions from which the and chute are suspended are located on a cross bar extending across the assembly above the static water line and parallel with the axis of disk rotation. More preferably, the bracket for the chute has a notch and the disk is mounted for rotation on an axle extending across the assembly located such that the chute bracket is further supported by interengagement of the notch with the axle.

Preferably all the bearings for rotatable members are located above the water line to reduce the likelihood of bearing failure and, in the event of bearing failure, replacement does not necessitate working with submerged parts or draining the system.

BRIEF DESCRIPTION OF THE DRAWINGS

For a fuller understanding of the nature of the present invention, reference should be had to the following detailed description taken in connection with the accompanying drawings in which:

FIG. 1 is a perspective view showing the oil and grease removal assembly of a first embodiment of the present invention in its operative condition;

FIG. 2 is a perspective view of a trough and removal structure associated with the embodiment of FIG. 1;

Like reference numerals refer to like parts throughout the several views of the drawings.

DETAILED DESCRIPTION OF THE PREFERRED EMBODIMENT

Figure 4:
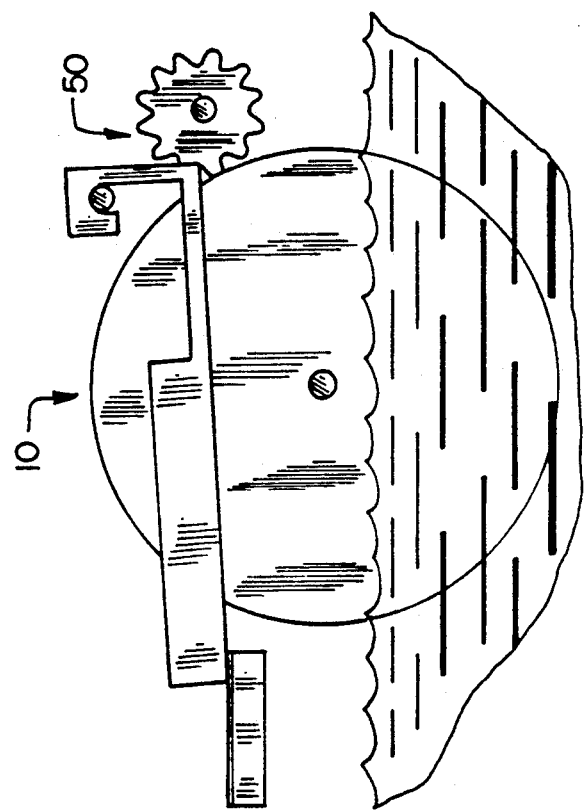
FIG. 4 is a schematic side elevation view of the assembly in operation.
Figure 3:
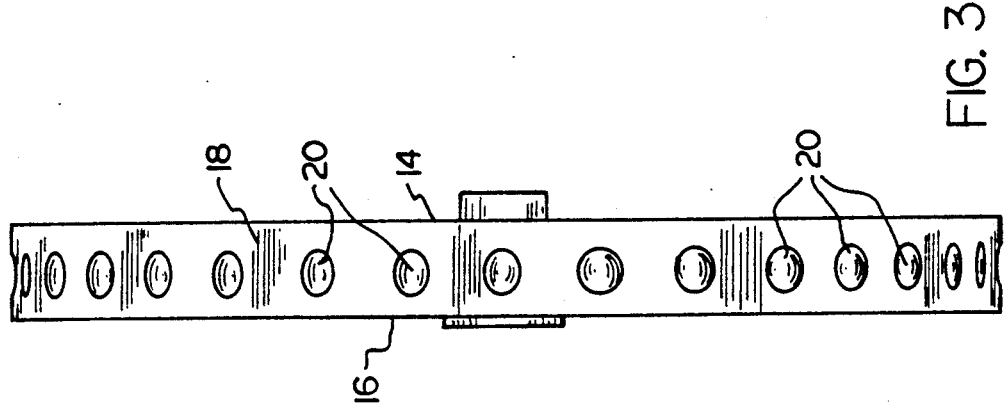
FIG. 3 is an edge elevation view of a disk as used in the invention.

As shown is the accompanying figures, the subject oil removal assembly is generally indicated as 10 and comprises a container 70 for holding water contaminated with oil and/or grease (the mixture of oil and grease or either independently are herein referred to as oil/grease). The contaminated water is received in container 70 via inlet 72 from a plumbing facility such as a dishwasher or the like found in commercial kitchens, restaurants, etc. and clarified water is discharged through outlet 74. Transversely mounted and supported in the container 70 are axles 76, 78 and cross bar 80. Cross bar 80 can function as a lug means on the supporting container 70. As seen in FIG. 1, the axle 76 is rotatable in bearings 77, one of which is shown in the broken away portion of the support 70. Rotatably mounted on axle 76 is disk 12 formed of a plastic or like material to which oil, grease and like contaminants are typically attracted, but water is not. The disk 12 has a substantially flat configuration including opposite sides 14, 16 and a transverse dimension or thickness evidenced by the width of the outer peripheral edge 18. The outer peripheral edge 18 has a plurality of openings 20 integrally formed therein spaced apart substantially continuously. The disk 12 is rotatable about axle 76 such that at least a portion of disk 12 is immersed within the liquid or other body of water to be cleaned, as shown in FIG. 4. In the embodiment shown, the water 24 contains an upper layer of oil/grease contaminants as at 26.

A drive means is generally indicated as 50 and comprises a forced rotating drive shaft 52 having affixed thereto a sprocket 54. The shaft 52 is driven by motor 51. The sprocket has fingers 56 extending radially outward from the center. The fingers 56 are disposed in spaced apart relation to one another and have a sufficient longitudinal dimension to successively pass into the plurality of openings 20 formed in the outer peripheral transverse edge 18 of the disk 12. The forced rotation of the sprocket 54 causes the continuous forced rotation of the disk 12 by continuous insertion and removal of the outwardly extending fingers 56 into the successive openings 20. The drive means therefore defines a peripheral drive arrangement for disk 12. Other drive means arrangements can be used to drive the peripheral edge of the disk 12, including substituting an elongated splined gear shaft 52 and sprocket 54, with interengaging teeth formed on the edge of the disk. Other gear arrangements may also be used, as well as frictional engagement with the periphery of the disk 12.

A removal means is generally indicated as 30 in FIG. 2 and includes an elongated trough structure having upwardly extending side walls 32, 34 extending along the length thereof. A central elongated slot or channel 36 is formed on the trough and extends along a majority of the length thereof. The trough 30 terminates in an open or delivery and generally indicated as 38. The opposite end is defined by a suspension means generally indicated as 40. A preferred suspension means takes the form of hook-shaped supports 64. The slot 36 has sufficient transverse and longitudinal dimension to allow the disk 12 to be positioned therein and to be constantly rotated while between two trough segments 42, 44. The trough segments 42, 44 are disposed adjacent opposite sides 14, 16 of the disk 12 and extend substantially along the length thereof. Further, one end of the trough segments 42, 44 terminates at the open delivery end.

The suspension means 40 is structured to be readily removably attached to a lug, such as cross bar 80. The suspension means 40 includes two spaced apart hook elements 64 integrally formed on the opposite end of the trough structure 30 relative to the open or delivery end 38. The hook structures 64 being spaced apart and parallel both serve to removably engage and be supported in depending relation from the support shaft 62. The integral or otherwise fixed attachment of the hook members 64 to the end as at 43 of the trough 30 serves to support the trough in the position shown in FIG. 1.

Two flexible scraper blades 46, 48 are secured to and extend outwardly from the opposite peripheral edges of the elongated slot 36 substantially adjacent the open or delivery end 38 thereof. These blades 46, 48 extend angularly inward into sliding engagement with oppositely disposed sides 16, 14 respectively of the disk 12. Continuous sliding engagement as the disk 12 rotates causes the oil, grease or like contaminants adhered to axial faces or sides 14, 16 of disk 12 to be removed substantially transversely along the respective blades 48, 46 and into the respectively positioned trough segments 44, 42. The oil/grease mixture then flows substantially longitudinally along the trough segments 42, 44 until it exits from the open or delivery end 38.

A chute 81 is provided to receive oil/grease discharging from trough 30. Chute 81 is rigidly secured to brackets 82, 84 which have hook means 86, 88 respectively as well as a recess 90 formed on bracket 82. Hook means 86, 88 are located so that the brackets may be suspended from cross bar 80, in a fashion similar to the suspension of trough 30, with the recess 90 located to interfit with axle 76, thereby providing solid support for chute 81. Chute 81, in turn, provides support for the delivery end 38 of trough 30.

Chute 81 has a slanted bottom 92, at a low portion of which is drain 94, leading to pump 96 which, in turn, outlets through tube 98 through container 70 to a suitable collection container. The tube 98 may desirably have its outlet through container 70 above the water line to avoid leakage of water from the container in the event of a seal failure and to facilitate replacement of the chute/pump assembly without requiring that a submerged connection be broken. Pump 96 is operated by motion transmitted from disk 14 through sprocket 99. As can be appreciated, the holes 20 in disk 14 are enmeshed with sprocket 99 in completely analogous fashion to the enmeshing of sprocket 54 with disk 12. As is conventional, a heater means (shown schematically in FIG. 4 as an electric resistance 22 connected to a power supply 24) is provided in the container 70 to heat the contaminated water to assure liquefaction of the oil/grease. Submergence of the pump 96 in the heated water assures that the oil/grease being pumped stays in liquid form during pumping. In addition, the mass of the pump 96 holds and conducts a considerable amount of heat to chute 81 to assist in maintaining the oil/grease in liquid form during passage in the chute. Of course, in cases where the drainage of oil/grease from the chute to its receptacle can be accomplished without the pump, the pump may be omitted. An advantage to including the pump is that, when the unit is off, the pump serves as a valve to close off the outlet, preventing water from passing to the receptacle in case of a contaminated water surge, which may result from a sudden heavy inflow or a plugging of outlet 78 or the sewer downstream thereof.

The ready serviceability of the apparatus should now be apparent. The trough 30, the part most likely to wear out by wear on blades 46, 48, may be very easily replaced by merely lifting the open end 38 past the top of disk 12, and unhooking the hook means 41. Installation of a replacement trough is even easier—the hook means need only be hooked around cross bar 80 straddling the disk 12 and the lower end pressed down slightly to engage the blades 46, 48 with disk 12. Rotation of disk 12 upon starting of the apparatus will further lower delivery end 38 into contact with chute 81.

Should replacement of the chute 81 or pump 96 be needed, the part to which they are affixed may be similarly easily removed and replaced.

In addition, the reliability of the apparatus is enhanced since the few moving parts exposed to the contaminated water are very simple. The sprockets and the specially-arranged peripheral holes on the disk 12 provide reliable interengagement even in the oil/grease environment, with little wear. However, other peripheral drive arrangements could be substituted. Also, it should be noted, as shown in FIG. 1, that the bearings are mounted in the walls of container 70 above the water line to reduce corrosion and permit servicing of the bearings without draining the container. In a preferred variant, the disk 12 is rotatably mounted on a fixed shaft, which is secured in the walls of the container 70 or support member.

As can be appreciated, various modifications may be made to the apparatus described herein without departing from the scope of the claims hereof. For example, by simply adding more disks on shaft 76 and more sprockets on shaft 52 with associated troughs, the separating capacity of the unit may be increased. As will be apparent, various components well known to those of ordinary skill may be incorporated in the apparatus, including solids strainers, baffles, gas traps and the like, in conventional manner.

Figure 5:
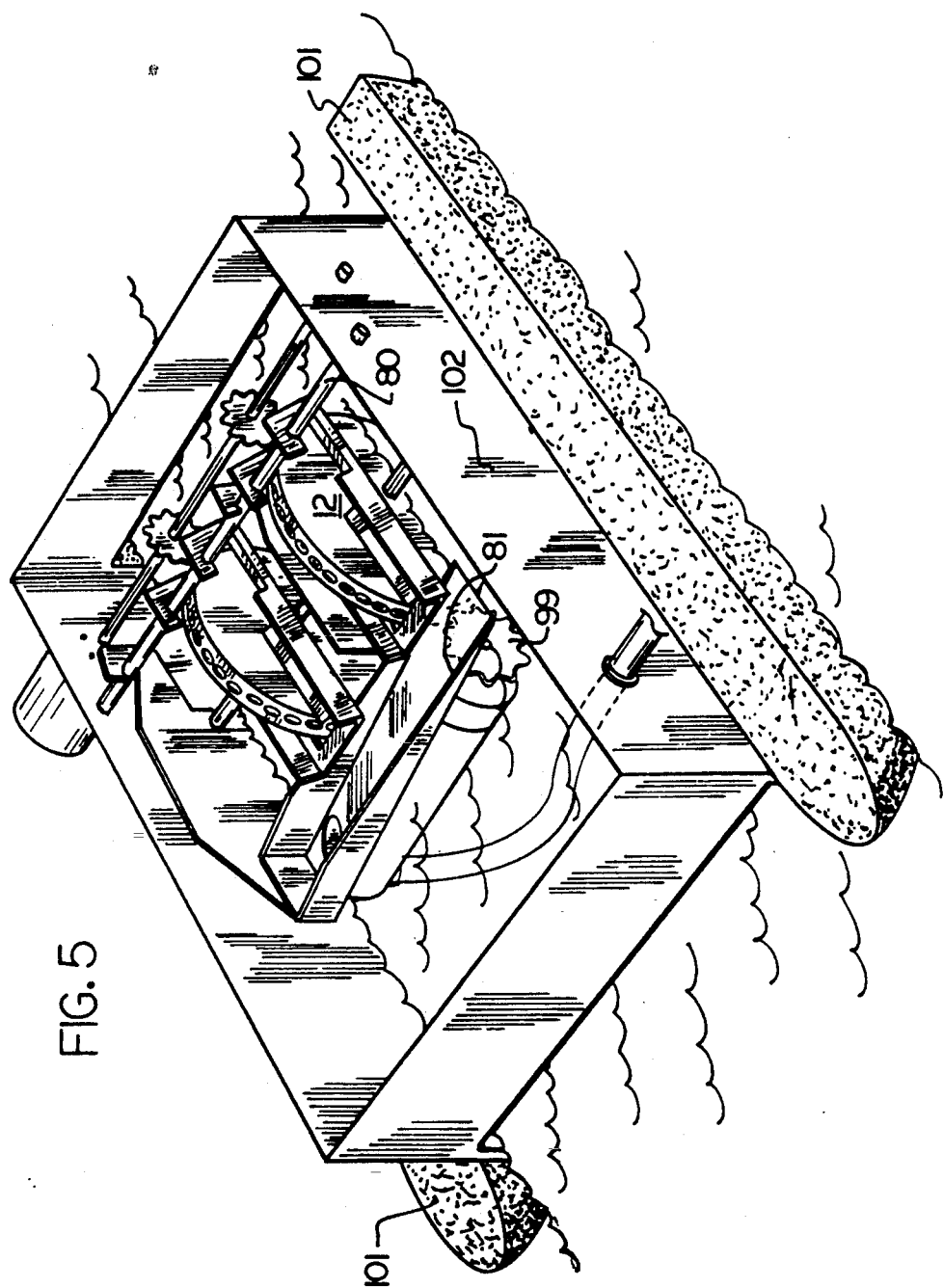
FIG. 5 is a perspective view of an alternative embodiment of the invention.

An alternative embodiment is shown in FIG. 5, in which the apparatus for separating oil/grease from water is mounted on a float mechanism so that the apparatus may be used for removal of oil/grease from large bodies of water. In this embodiment, floats 101 support an open-bottomed frame 102 which supports the various lugs, wheels, etc. analogeously as container 70 does in FIG. 1. In this case, the drain from pump 96 may go a long distance to a recovery receptacle, such as a tanker ship or onshore tank. Alternatively, a receptacle can be mounted on the floats 101.

A further embodiment may omit the floats 101 and be provided with a means to affix the apparatus onto another vessel which contains the contaminated water.

What is claimed is:

1. An oil or grease removal assembly comprising:

a) a container means for holding a body of liquid including oil or grease to be removed disposed generally along an upper surface thereof;

b) at least one disk rotatably supported in a partially immersed position within the body of liquid and in contact with the oil or grease;

c) a drive means mounted in driving engagements with said disk for continuous rotation thereof when said drive means is activated;

d) removal means removably mounted above said container in engaging relation to opposite sides of said disk and disposed in a substantially horizontal orientation in spaced relation to an upper surface of the body of liquid and the oil or grease therein;

e) said removal means comprising an elongated trough having a length and an open end and a centrally disposed slot extending along at least a majority of the length and being dimensioned traversely to the length to allow positioning of said disk within said slot;

f) two elongated scraper blades mounted on said trough and each scraper blade extending angularly inward with respect to said slot from a different peripheral edge of said slot into sliding engagement with a side of said disk;

g) said disk, scraper blades and trough cooperatively disposed and structured to direct oil concurrently from opposite sides of said disk, substantially transversely along said scraper blades and therefrom longitudinally along the length of said trough to exit at said open end of said trough during continuous rotation of said disk, and h) support means secured to said trough in spaced relation to said open end and extending therefrom for supporting engagement of a remainder of said trough with an external support located above said trough.

2. An assembly as in claim 1 wherein said support means comprises a hook structure extending upwardly from an end of said trough opposite said open end when said trough is in an operative position and disposed and configured to removably engage said support means.

3. An assembly as in claim 2 wherein said hook structure comprises two spaced apart substantially parallel hook elements and said open end is disposed in a supported orientation separate from said hook structure to define a substantially horizontal outwardly extending orientation of said trough relative to said disk and above the body of liquid.

4. An assembly as in claim 1 wherein said drive means comprises a rotatably driven gear element disposed substantially in coplanar relation to said disk and in driving engagement with an outer peripheral edge thereof.

5. An assembly as in claim 4 wherein said disk is rotatably mounted on a support shaft and said gear element is rotatably driven on a drive shaft disposed in spaced parallel relation to said support shaft.

6. An assembly as in claim 4 wherein said disk has formed therein a plurality of openings spaced apart continuously along said outer peripheral edge, said gear member is structured to drivingly contact said outer peripheral edge through successive contact with said plurality of openings to cause rotation of said disk.

7. An assembly as in claim 6 wherein said gear member comprises a plurality of fingers extending radially outwardly from a central portion of said gear member, said plurality of fingers disposed and dimensioned to be successively positioned into and out of said plurality of openings causing rotational driving of said disk upon forced driven rotation of said gear member.

8. An assembly as in claim 1 wherein said trough comprises two elongated trough segments extending at least the length of said respective scraper blades and disposed on opposite sides of said disk, said trough segments extending from an innermost end of respective ones of said scraper blades to said open end of said trough and being structured to direct liquid flow therealong upon rotation of said disk.

9. An apparatus configured and arranged for separating oil/grease from water contaminated with oil/grease and having a water line comprising:

a) support means including lug means;

b) a disk rotatable in said support means to adheringly lift oil/grease from the contaminated water to a space above said water line;

c) a trough having a slot therein disposed in said support means with said disk located in said slot, scraping means on said trough extending into said slot into scraping contact with said disk to scrape oil/grease from said disk as said disk rotates, said trough having an upper end and a lower end such that liquid in said trough drains to said lower end and having suspension means spaced from said lower end readily separably engagable with said lug means so that said trough may be readily removed from apparatus housing; and d) chute means in said support means positioned to receive oil/grease from said lower end of said trough.

10. An apparatus as claimed in claim 9 wherein said suspension means comprise hook means.

11. An apparatus as claimed in claim 10 wherein said trough has side walls and said hook means comprises a hook-shaped extension of said side walls.

12. An apparatus as claimed in claim 9 wherein said scraping means includes a flexible plastic strip affixed to an edge of said slot and extending into said slot and upward against said disk.

13. An apparatus as claimed in claim 9 wherein said chute means has a support bracket readily separably engagable with said lug means to hold said chute in place.

14. An apparatus as claimed in claim 13 wherein said disk rotates on an axle and said support bracket has a notch which interengages said axle to provide further support for said support bracket.

15. An apparatus as claimed in claim 9 wherein said chute means includes a drain to drain oil/grease from said chute as it is collected from said trough and further comprising a pump downstream of said drain to assist in draining collected oil/grease.

16. An apparatus as claimed in claim 15 wherein said pump is located below said water line and further comprising a heater to heat water in said container, whereby oil/grease in said pump is maintained in flowable form by heat transmitted to the oil/grease from the water, through said pump.

17. An apparatus as claimed in claim 15 wherein said pump has a motive power transmission means associated with said disk for transmitting power from said disk to said pump to drive said pump.

18. An apparatus as claimed in claim 17 wherein said disk has radially arrayed openings and said motive power transmission means comprises a sprocket enmeshed with said openings.

19. An apparatus as claimed in claim 9 wherein said disk is made of polypropylene.

20. An apparatus as claimed in claim 9 wherein said disk is fixed on an axle rotatable in bearings in said support means above the water line.

21. An apparatus configured and arranged for conveying oil/grease from a disk having a thickness and rotating in water contaminated with oil/grease about an axis of rotation and held in a support means having lug means and an outlet chute disposed in a plane parallel to the axis of rotation of the disk comprising:
   a) a trough having a bottom and two side walls, said bottom having a slot formed therein of a width greater than the thickness of the disk, said slot being partially closed by flexible scraper means extending from said bottom into said slot, said trough having first and second ends; and
   b) said first end has a curved hook means for suspending said trough from the lug means in the support means, said support means extending above said slot.

22. An apparatus as claimed in claim 21 wherein said trough has a length greater than the distance from the lug means to the outlet chute, so that said second end of said trough is supported by the chute when said trough has been installed in the support means.

23. An apparatus configured and arranged for separating oil/grease from water contaminated with oil/grease and having a water line comprising:
   a) support means, a disk having axial faces and a peripheral edge rotatably supported in said support means to lift oil/grease from the contaminated water to a space above the water line by adhesion to said axial faces, said peripheral edge provided with radially arrayed openings;
   b) a drive means including a shaft journaled in said support means and a drive gear, said drive gear being fixed on said shaft and a motor outside side of said support means adapted to rotate said shaft, said shaft and said disk disposed in said support means so that said drive gear engages said peripheral edge of said disk, so that rotation of said drive gear by operation of said motor causes rotation of said disk; and
   c) means in said support means for scraping oil/grease from said axial faces of said disk above said water line and directing collected oil/grease to a separate container.

24. An apparatus as claimed in claim 23 wherein said drive gear rotates about an axis parallel with the axis of rotation of said disk.

25. An apparatus as claimed in claim 23 wherein said drive gear has teeth which engage openings in said peripheral edge above said water line.

26. An apparatus as claimed in claim 23 wherein said means for scraping and directing oil/grease includes a pump for collected oil/grease and said pump has a drive gear which engages with said peripheral edge of said disk so that said pump operates as said disk rotates.

27. An apparatus configured and arranged for separating oil/grease from water contaminated with oil/grease comprising:
   a) a housing to receive the contaminated water up to a water line, said housing provided with lug means;
   b) a disk rotatable in said housing to adheringly lift oil/grease from the contaminated water to a space above said water line and having peripheral openings;
   c) a drive means including an axle journaled in said housing parallel the axis of rotation of said disk above said water line and a sprocket having teeth, said sprocket being fixed on said axle and a motor outside side of said housing adapted to rotate said axle, said axle and said disk disposed in said housing so that said teeth engage said openings in said disk above said water line, so that rotation of said sprocket by operation of said motor causes rotation of said disk;
   d) a trough having a slot therein disposed in said housing with said disk located in said slot, a flexible plastic scraping strip affixed to an edge of said slot and extending into said slot and upward against said disk to scrape oil/grease from said disk as said disk rotates, said trough having an upper end and a lower end such that liquid in said trough drains to said lower end and having side walls and hook-shaped extensions of said walls spaced from said lower end readily separably engagable with said lug means so that said trough may be readily removed from said housing; and
   e) chute means in said housing positioned to support said lower end and to receive oil/grease from said lower end of said trough and having a support bracket readily separably engagable with said lug means to hold said chute in place and including a drain to drain oil/grease from said chute as it is collected from said trough and further comprising a pump downstream of said drain to assist in draining collected oil/grease, said pump being located below said water line and further comprising a heater to heat water in said container, whereby oil/grease in said pump is maintained in flowable form by heat transmitted to the oil/grease from the water, through said pump, said pump having a motive power transmission means associated with said disk for transmitting power from said disk to said pump to drive said pump;
   f) said disk having radially arrayed openings and said motive power transmission means comprising a sprocket enmeshed with said openings.

28. A method for separating oil/grease from water contaminated with oil/grease comprising the steps of:
   a) holding the contaminated water in a housing to a water line;
   b) providing lug means in the housing;
   c) rotating a disk in the housing to adheringly lift oil/grease from the contaminated water to a space above the water line;
   d) scraping oil/grease from the disk as the disk rotates;
   e) directing scraped oil/grease into a trough which straddles the disk;
   f) permitting directed oil/grease to flow under the influence of gravity to a lower end of the trough;
   g) readily separably engaging the trough with the lug means at a location on the trough spaced from the lower end of the trough; and
   h) supporting the lower end of the trough with a chute and using the chute to collect oil/grease from the lower end of the trough.

* * * * *

UNITED STATES PATENT AND TRADEMARK OFFICE
CERTIFICATE OF CORRECTION

PATENT NO.   : 5,133,881
DATED        : July 28, 1992
INVENTOR(S)  : B. Glenn Miller
               William C. Batten It is certified that error appears in the above—identified patent and that said Letters Patent is hereby corrected as shown below:

In the Claims, column 10, line 7, delete the word "side" which appears after the word "outside"

Signed and Sealed this

Thirty-first Day of August, 1993

Attest:

BRUCE LEHMAN

Attesting Officer

Commissioner of Patents and Trademarks